United States Patent [19]
Yoda et al.

[11] Patent Number: 5,893,978
[45] Date of Patent: Apr. 13, 1999

[54] PURIFYING METHOD AND PURIFICATION SYSTEM FOR LAKES AND MARSHES

[75] Inventors: Hiroaki Yoda; Shiro Nakadaira, both of Tsuchiura; Toshio Masuda, Tsukuba; Takashi Mizumori, Ibaraki-ken; Koichi Tsuzuki, Tsuchiura, all of Japan

[73] Assignee: Hitachi, Ltd., Tokyo, Japan

[21] Appl. No.: 08/794,902

[22] Filed: Feb. 4, 1997

[30] Foreign Application Priority Data

Feb. 9, 1996 [JP] Japan ........................ 8-023912

[51] Int. Cl.$^6$ ........................................... E02B 15/04
[52] U.S. Cl. ........................ 210/747; 210/170; 405/63
[58] Field of Search ........................ 210/153, 154, 210/155, 170, 747; 405/52, 60, 63, 107

[56] References Cited

U.S. PATENT DOCUMENTS

| | | |
|---|---|---|
| 1,397,891 | 11/1921 | Jones . |
| 1,397,892 | 11/1921 | Jones . |
| 3,505,213 | 4/1970 | Anthony et al. . |
| 3,563,380 | 2/1971 | Thomas ................ 210/170 |
| 3,779,385 | 12/1973 | Strohecker ............ 210/154 |
| 3,817,383 | 6/1974 | Michel et al. ......... 210/170 |
| 3,850,807 | 11/1974 | Jones .................... 210/170 |
| 4,122,012 | 10/1978 | Vlasnik ................. 210/170 |
| 4,452,548 | 6/1984 | Balogh et al. ........ 210/170 |
| 4,695,384 | 9/1987 | Ripl et al. ............ 210/747 |
| 4,808,305 | 2/1989 | Arnold ................. 210/170 |
| 5,106,492 | 4/1992 | Distinti et al. ....... 210/169 |
| 5,143,623 | 9/1992 | Kroll ................... 210/170 |

*Primary Examiner*—Robert Popovics
*Attorney, Agent, or Firm*—Antonelli, Terry, Stout & Kraus, LLP

[57] ABSTRACT

A purification system is provided for purifying the water of eutrophic lakes and marshes by partitioning the target lake/marsh to form a specified water treating area therein. For this purpose, a partitioning structure is provided for enclosing and partitioning the whole or part of an area around the mouth of each river flowing into the target eutrophic lake/marsh in the direction of depth to form a water treating water area; and a purifier for taking in water from the water treating area operates to separate and remove pollutants from the water, and then discharges treated water outside the water treating area.

21 Claims, 7 Drawing Sheets

PURIFYING METHOD AND PURIFICATION SYSTEM FOR LAKES AND MARSHES

BACKGROUND OF THE INVENTION

This invention relates to a method and equipment for purifying lakes and marshes, and, more particularly, to technologies for purifying closed water areas, such as eutrophic lakes, marshes, dammed lakes, harbors, and the like, and especially, to technologies for purifying closed water areas serving as tap water sources or water areas in sight-seeing and recreation parks.

In recent years, many lakes and marshes have been polluted with eutrophic materials, such as nitrogen, phosphorus, and other similar materials which flow into them, particularly bodies of water which are closed and used as tap water sources. In those lakes and marshes, algae tends to grow quickly further accelerating such eutrophication, thereby polluting the water quality. So far, various technologies have been proposed for purifying those closed water areas. Those proposals can be classified into technologies for removing pollutants mechanically, technologies for activating microorganisms to treat the water, technologies for treating pollutants with chemicals, technologies for circulating part of the water for treatment in closed water areas, etc.

One of such prior art technologies, as disclosed in Japanese Patent Laid-Open No.95498/1990, relates to a method and equipment for treating eutrophic water in closed water areas. The method and equipment is provided with a process and equipment for removing algae growing thickly in eutrophic water; a process for treating water with an aerobic microorganisms; a process and equipment for treating water with aerobic microorganisms; and a process and equipment for removing residual phosphorus by chemical treatment.

Another prior art technology is disclosed in Japanese Patent Laid-Open No.287/1993. It relates to a purifier used for polluted water, wherein the purifier is provided with a bubble collecting raft provided with floats, each of which comprises top-recessed tubs arranged side by side at proper intervals, the tubs being connected to a catamaran frame on the water inside the catamaran frame so that each tub can be adjusted to a deep waterline; a bubble generator that generates bubbles from under the bubble collecting raft; and a bubble connecting means provided in each of the tubs for collecting bubbles coming into the tub, so that pollutants may be removed from the water in the target closed water area, such as a lake, marsh, sea, etc. to purify the water quality.

As eutrophication increases in closed water areas, such as lakes, marshes, dammed lakes, and the like, which are used as tap water sources or water parks, purifying facilities have also been reinforced with various purifying technologies. However, elements such as nitrogen, phosphorus, etc. that accelerate eutrophication in closed water areas are mainly supplied from rivers flowing into those water areas. The pollutants in the water from those rivers are diluted further in the water which is retained in closed water areas. Thus, a large amount of water must be treated when the above prior art is used. Furthermore, when the above prior art is used, the purifier manufacturing cost, the installation space, the driving energy, etc. is so large that the prior art has not been adopted in actual practice.

SUMMARY OF THE INVENTION

An object of this invention is therefore to provide a method and equipment for purifying lakes and marshes in order to solve such prior art problems as discussed above and also general eutrophication problems caused by pollutants to obtain good quality water sources, as well as to restore water parks damaged by pollutants. A further object of this invention is to provide a method and equipment for purifying lakes and marshes, which can more effectively and reliably improve the quality of the water in closed water areas having a large amount of water.

A further object of this invention is to provide a purifier for lakes and marshes, which can separate and remove pollutants, such as eutrophic materials and algae, from the target water Using simple equipment.

In order to achieve the above objects, the first feature of this invention's purifying method for lakes and marshes is a method for purifying the target lake/marsh by partitioning it into a specified closed water area, including forming a water treating area enclosed at the mouth of the river flowing into the target lake/marsh; separating and removing pollutants from the water; and discharging treated water outside the water treating area.

In order to achieve the above objects, the second feature of this invention's purifying method for lakes and marshes is a method for purifying the target eutrophic lake/marsh into which two or more rivers are flowing, including enclosing and partitioning the whole or part of an area around the mouth of each river flowing into the target eutrophic lake/marsh in the direction of depth to form respective water treating areas; taking in water from the water treating areas to separate/remove pollutants from the water; and discharging treated water outside the water treating areas, so that purifying treatment can be carried out for those rivers sequentially in accordance with the amount of pollutants such as nitrogen, phosphorus, and the like contained in the rivers.

In order to achieve the above objects, the first feature of this invention's purification system for lakes and marshes includes a structure for forming a water treating area at the mouth of the river flowing into the target lake/marsh; and means for taking in water from the water treating area to separate and remove pollutants from the water, and then discharging treated water outside the water treating area.

In the above case, the purifying means should be provided in the water treating area for the most effective purification. The purifying means may also be fixed on land near the mouth of the river.

Furthermore, in order to achieve the above objects, the second feature of this invention's purification system for lakes and marshes comprises a purifier for purifying the target water treating area partitioned from the target eutrophic lake/marsh, including means for enclosing and partitioning the whole or part of an area around the mouth of the river flowing into the target eutrophic lake/marsh in the direction of depth to form a water treating area; and means for taking in water from the water treating area to separate and remove pollutants from the water, and then discharging treated water outside the water treating area.

Furthermore, in order to achieve the above objects, the third feature of this invention's purification system for lakes and marshes includes a purifier for purifying the target eutrophic lake/marsh into which two or more rivers are flowing; means for enclosing and partitioning the whole or part of the area around the mouth of the river flowing into the target eutrophic lake/marsh in the direction of depth to form a water treating area; and means for taking in water from the water treating area to separate and remove pollutants from the water, and then discharging treated water outside the water treating area, which are provided in those rivers to operate sequentially in accordance with the amount of eutrophic pollutants such as nitrogen, phosphorus, etc. contained in the rivers.

Furthermore, in order to achieve the above objects, the fourth feature of this invention's purification system for lakes and marshes comprises means for enclosing and partitioning the whole of an area around the mouth of the river flowing into the target lake/marsh actually in the direction of depth to form a water treating area, wherein the means is a partitioning structure for forming the water treating area located from the mouth of the river by a distance of about 10 times the width of the river mouth; and means for taking in water from the water treating area to separate and remove pollutants from the water, and then discharging treated water outside the water treating area, wherein the means is a purifier that can treat an amount of water equal to the amount of the flow of water at the river mouth leading to the target lake/marsh.

The above partitioning structure may be provided at a point offshore where the flow rate becomes about ½ of that at the river mouth.

If the above partitioning structure is provided in the water treating area positioned from the river mouth by a distance of about 10 times the width of the river mouth, or it the above partitioning structure is provided offshore where the flow rate becomes about ½ of that at the river mouth, then the partitioning structure can be protected sufficiently from the impact of a flow which is rapidly increased after a heavy rainfall.

In this embodiments each partitioning structure used for forming the water treating area comprises many partitioning members, each of which carries a weight; a member for connecting those partitioning members in a shape of reed screen in the direction of depth; and floating structures for holding the reed-screen-like partitioning structure in the water.

The purifier is also provided with a pump for taking in water from the water treating area; a filtration tank for purifying the water by causing it to contact a filter media, and then discharging purified water; and a settling tank for settling floating matter included in the water discharged from the filtration tank.

The purifier used for purifying water in the water treating area is provided with a pump for taking in water from the water treating area; means for settling floating matter included in the pumped-up water; and a filtration tank for purifying the water by making it contact the filter media, then discharging purified water.

Each of the above purifiers is provided with floating structures with which support the purifier so that it can float in the water treating area in the target lake/marsh Other features, objects, and effects of this invention will become clear from the following description to be made with reference to the attached drawings.

DESCRIPTION OF PREFERRED EMBODIMENTS

Hereunder, embodiments of this invention will be described with reference to FIG. 1 through FIG. 7.

Embodiment

Embodiment 1

Figure 1:
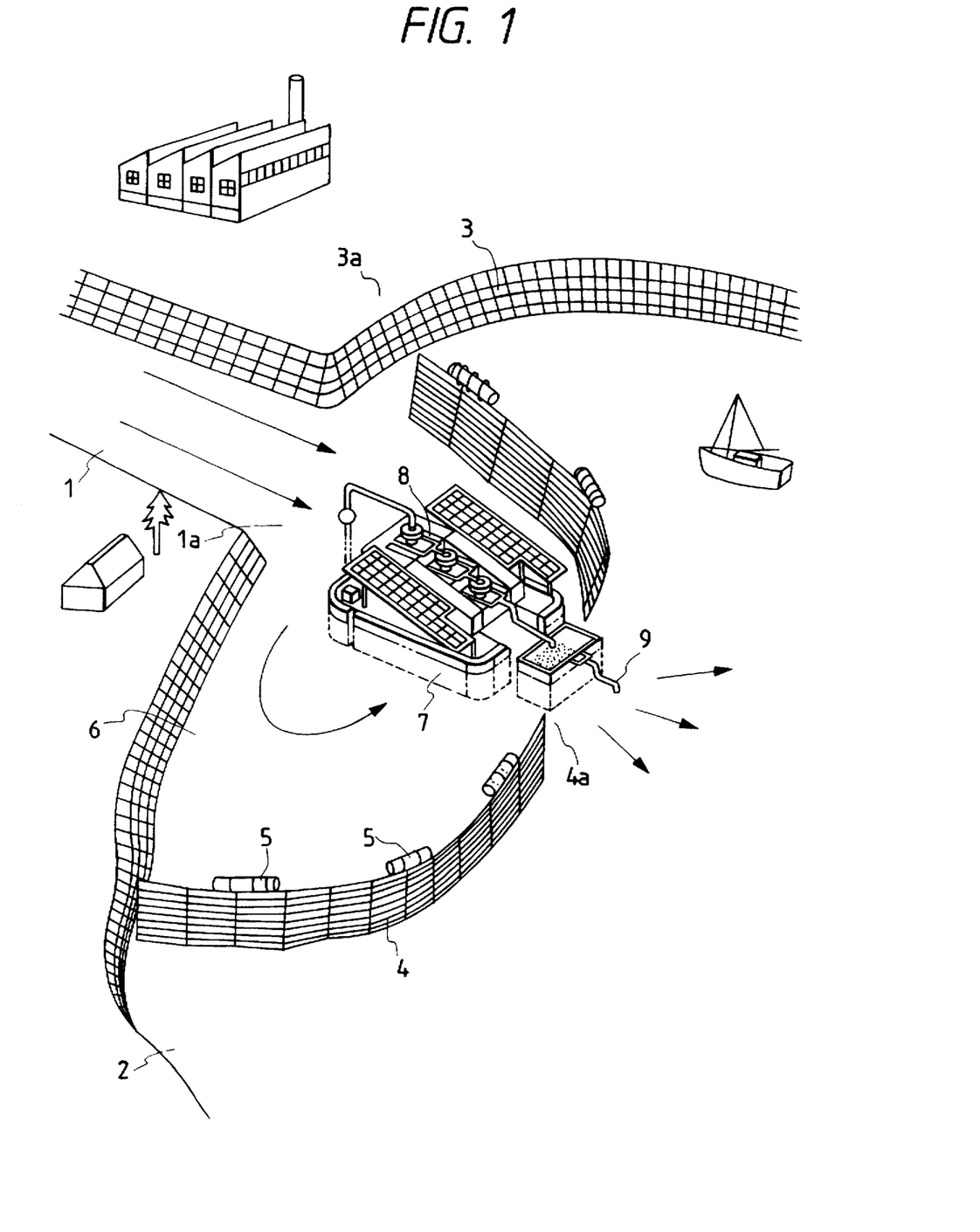
FIG. 1 is a perspective view of a purification system for eutrophic lakes and marshes, representing an embodiment of this invention.

FIG. 1 is a perspective view of a purification system for eutrophic lakes and marches, showing an embodiment of this invention as installed at the mouth of a river flowing into an eutrophic lake/marsh.

In FIG. 1, a river 1 flows into a lake/marsh 2, which represents a closed water area, defined by the bank 3 of the lake/marsh. The river 1 flows into the lake/marsh 2 at the mouth 1a of the river, including the surrounding basin.

In recent years, many closed water areas, such as lakes, marshes, dammed lakes, harbors, and the like, are polluted with living drainage and rainwater containing a large amount of eutrophic materials, such as nitrogen, phosphorus, etc. flowing into them from rivers. In addition to such water pollution, the scenery of those water areas is also damaged by a large amount of algae breeding thickly in eutrophic water. Under such circumstances, there is a strong desire, from a social and ecological point of view to prevent eutrophication in those closed water areas and to separate/remove eutrophic materials from river water flowing into those closed water areas.

In the embodiment shown in FIG. 1, therefore, a partition 4, comprising a series of partitioning members, is installed at the mouth 1a of the target river 1 to enclose it from the offshore side of the lake/marsh 2 to form a water treating area 6 for reserving the river water temporarily. The water in this water treating area 6 is treated and discharged out of the water treating area, preventing river water containing much eutrophic materials from flowing into the rest of the lake/marsh as it is. Thus, this embodiment can prevent the target closed water area, such as a lake/marsh 2, from eutrophication.

The purifier 8 shown in FIG. 1 used as purifying means, is installed on a floating structure 7. The floating structure 7 is held by an anchor (not illustrated) provided at the opening 4a of the partition 4 in the water treating area 6. The purifier 8 takes in water from the water treating area 6 via the front edge provided on the river side of the floating structure 7 and discharges treated water through a discharge pipe 9 from the rear edge of the floating structure 7. The amount of water to be treated by the purifier 8 should preferably be approximately equal to the target river flow. If it is less than the amount of the river water flow, however, the rest of the water can be released into the lake/marsh 2 from the opening 4a of the partition 4.

According to the above configuration, the water of the river 1, containing highly concentrated eutrophic materials, is purified and then flows into the lake/marsh 2, which is a closed water area, so that the lake/marsh can be prevented from eutrophication.

In the embodiment shown in FIG. 1, the purifier 8 is installed so that it may float a little closer to the opening 4a of the partition 4, but the purifier may be fixed at the bottom of the river. The purifier may also float in the water treating area 6 or be fixed at the bottom of the river in the water treating area 6.

In the embodiment shown in FIG. 1, the following concept is adopted for forming the water treating area 6 using the partition 4.

Generally, when water from the river 1 flows to a point offshore by a distance 10 times the width of the mouth of the river, the speed of flow drops to about a half. Thus, the partition 4 is installed to form the water treating area 6 with a distance from the mouth of the river 1a to a point offshore of about 10 times the width of the river mouth. Otherwise, the partition is installed to form the treating water area 6 at a point offshore where the flow speed becomes about ½ of that of the river 1 at the mouth 1a. With this, the partition 4 can cope with the strong impact of the river water created, for example, by a heavy rainfall and can be protected from damage under such circumstances.

In the above case, a resin sheet or net is used as the partition 4. This partition 4 is not expected to block the water completely. It is just expected to prevent the water in the target lake/marsh from mixing with the river water reserved in the water treating area 6 to a certain degree. On the other hand, if the partition 4 allows a small amount of lake/marsh water to flow in/out, the partition 4 can reduce the external force of the river flow and waves caused by wind, working against itself, so that it can be protected from being damaged and washed away. The partition 4 is usually suspended by floating members, such as buoys from the surface of the water.

Embodiment 2

Figure 2:
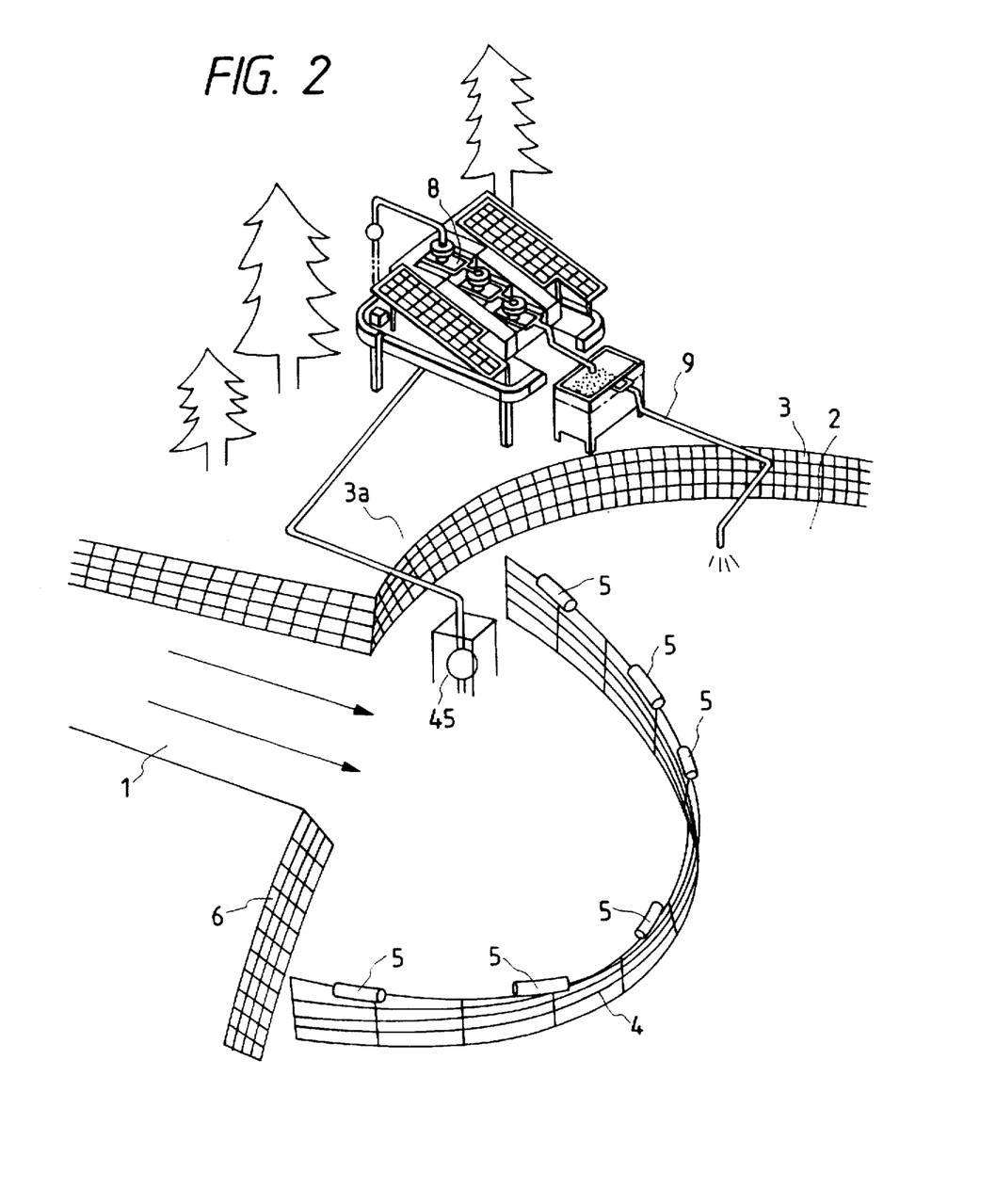
FIG. 2 is a perspective view of a purification system for eutrophic lakes and marshes, representing another embodiment of this invention.

The purifier 8 may also be installed on land near the mouth of the river. FIG. 2 shows such an embodiment.

FIG. 2 is an oblique view of a purification system for eutrophic lakes/marshes, showing another embodiment of this invention. In the drawing, explanation will be omitted for the same items as those in FIG. 1.

The purifier 8 shown in FIG. 2 is installed on the lake bank 3a. Since it is installed on land, no floating structure 7 is needed. Reference numeral 45 indicates an intake submersible pump.

In the purifier shown in FIG. 2, both intake and discharge pipes become longer, but operation and maintenance of the purifier 8 become easier. Furthermore, treated water can be discharged into a closed water area outside the water treating area 6, that is, to a given area in the target lake/marsh 2.

Treated water can also be returned to the target lake/marsh 2 after it is used, for example, for fountains, etc. in a part located near the river mouth.

Embodiment 3

Figure 3:
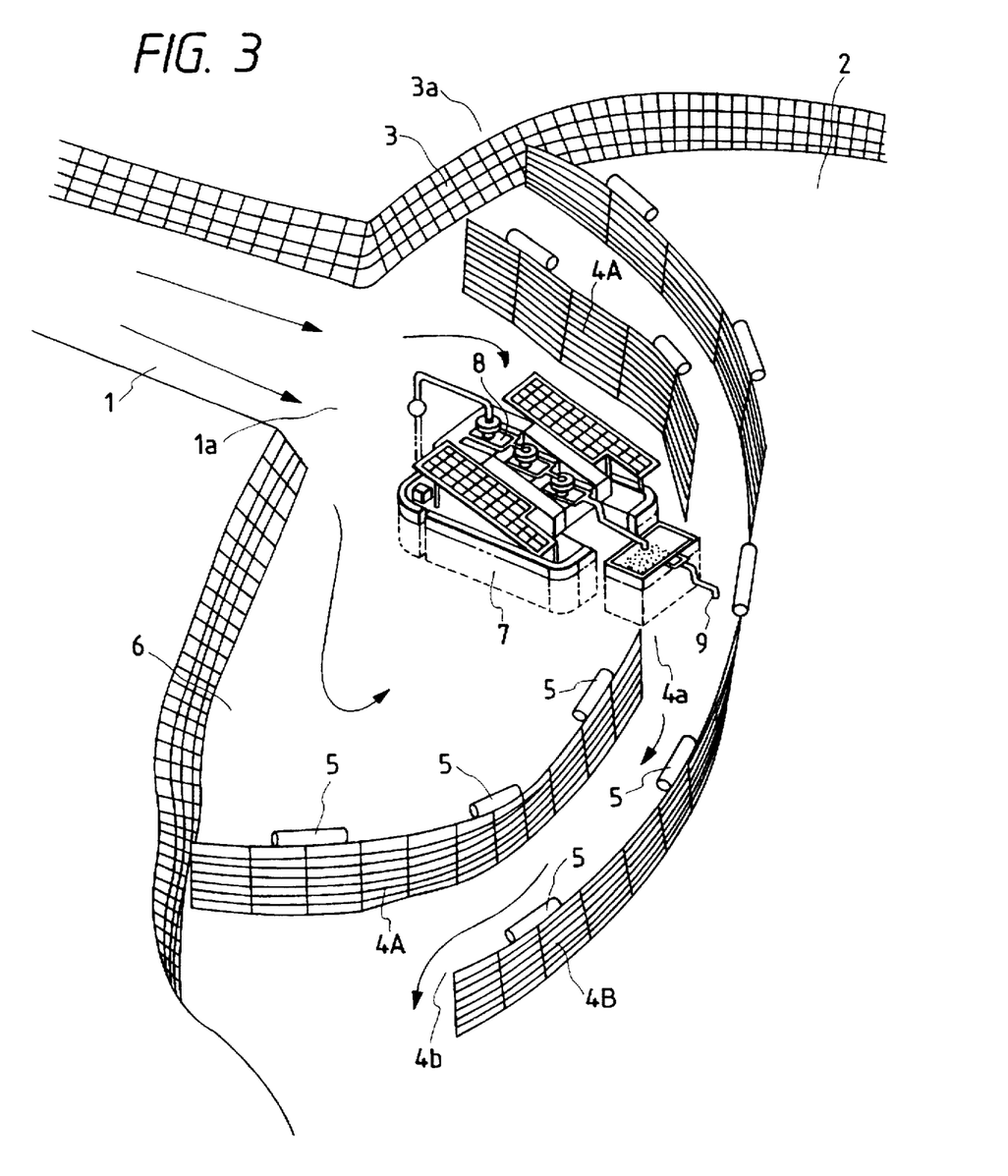
FIG. 3 is a perspective view of a purification system for eutrophic lakes and marshes, representing a further embodiment of this invention.

FIG. 3 shows a further embodiment of this invention in which a water treating area is secured by partitioning the river mouth 1a with the partition 4.

FIG. 3 is a view of a purification system for eutrophic lakes/marshes showing a further embodiment of this invention. In the drawing, the same reference numerals are applied to the same items as those in FIG. 1.

In the embodiment shown in FIG. 3, the river mouth 1a is enclosed by double partitions 4A and 4B.

In other words, in the embodiment shown in FIG. 3, a purifier 8 is floating a littler closer to the opening 4a of the partition 4A, and the partition 43 is installed outside the partition 4A. No opening is provided for the partition 4B in an area facing the opening 4a of the partition 4A. With this configuration, the water containing a substantial amount of eutrophic materials in the water treating area is mixed to a lesser extent with the water from the target lake/marsh 2 when it is reserved in the water treating area 6.

The water treated in the purifier 8 is discharged into the target lake/marsh 2 from the opening 4a of the partition 4A and through the channel provided between the partitions 4A and 4B.

Embodiment 4

Figure 4:
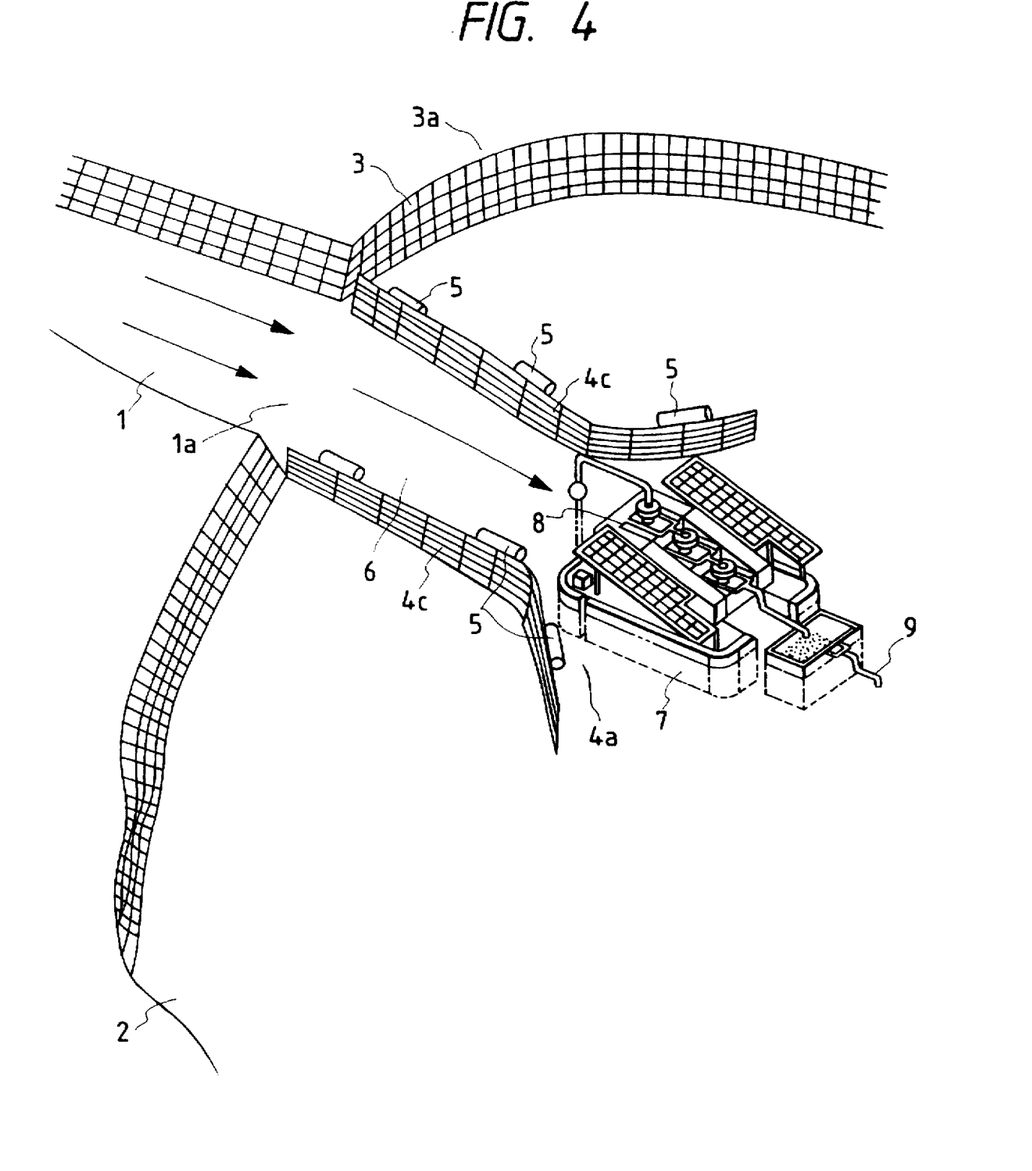
FIG. 4 is a perspective view of a purification system for eutrophic lakes and marshes, representing a still further embodiment of this invention.

FIG. 4 shows another embodiment of this invention representing a different arrangement of the partition 4.

FIG. 4 is a view of a purification system for eutrophic lakes/marshes. In the drawing, the same reference numerals are applied to the same items as those in FIG. 1, and redundant explanation thereof will be avoided.

In the embodiment shown in FIG. 4, the partition 4C is installed so that it may extend the channel of the river 1 and its end may be widened and opened outward. The purifier 8 is positioned at the opening 4a. With such an installation of the partition 4C, the water treating area 6 can be limited more strictly to secure a navigable passage in the river. Furthermore, scattering of eutrophic materials can be prevented especially in a slow flow condition of the river.

Now, an example of the construction of the partition 4 (including 4, 4A, 4B, and 4C) adopted for each of the above embodiments will be described with reference to FIG. 5.

Figure 5:
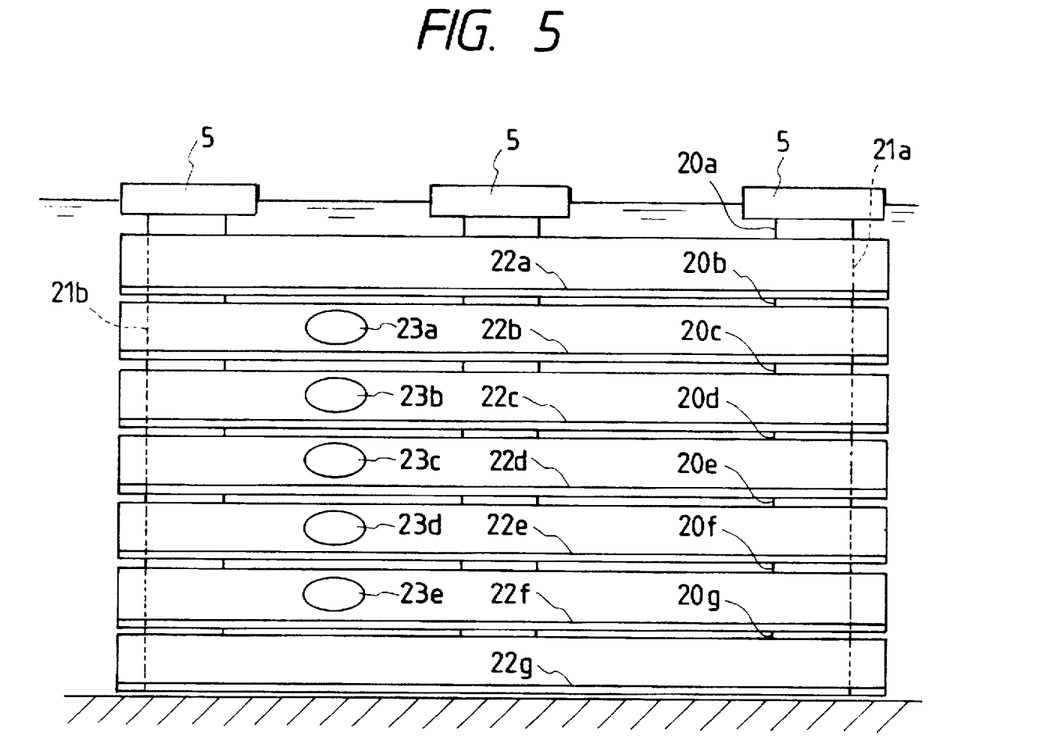
FIG. 5 is a front view of a partitioning structure used for a purification system of this invention for eutrophic lakes and marshes.

FIG. 5 is a front view of a partition used for a purification system according to this invention for eutrophic lakes/marshes.

The partition 4 shown in FIG. 5 comprises many partition members 20a, 20b, 20c, 20d, 20e, 20f, 20g, and chains 21a and 21b that are tied like a reed screen and arranged to extend down to the bottom of the lake. It is held by floating members 5 in the water.

Each of the partition members (20a, 20b, 20c, 20d, 20e, 20f, and 20g) carries a weight (22a, 22b, 22c, 22d, 22e, 22f, or 22g) to allow it to hand and keeps it from being washed away.

Furthermore, the reed-screen-like partition 4 is provided with two or more openings 23a, 23b, 23c, 23d, 23e, and 23f to ease the impact of the river water against its surface. Each of those openings may be opened/closed to create a larger area to cope with an increase of the river water after a heavy rain, especially in/after a typhoon.

In any event, the partition 4 should be installed to enclose part of the river mouth leading to the target closed water area, such as a lake, marsh, dammed lake, harbor, and the like, to form a water treating area 6. On the other hand, since various objects are carried into the water treating area from the river 1, the periphery of the floating member, etc. should be made of metallic net, and the like (not illustrated), sufficient to stand the force of these objects.

Embodiment 5

Subsequently, the purifier of this invention will be explained in more detail with reference to FIG. 6 and FIG. 7.

Figure 6:
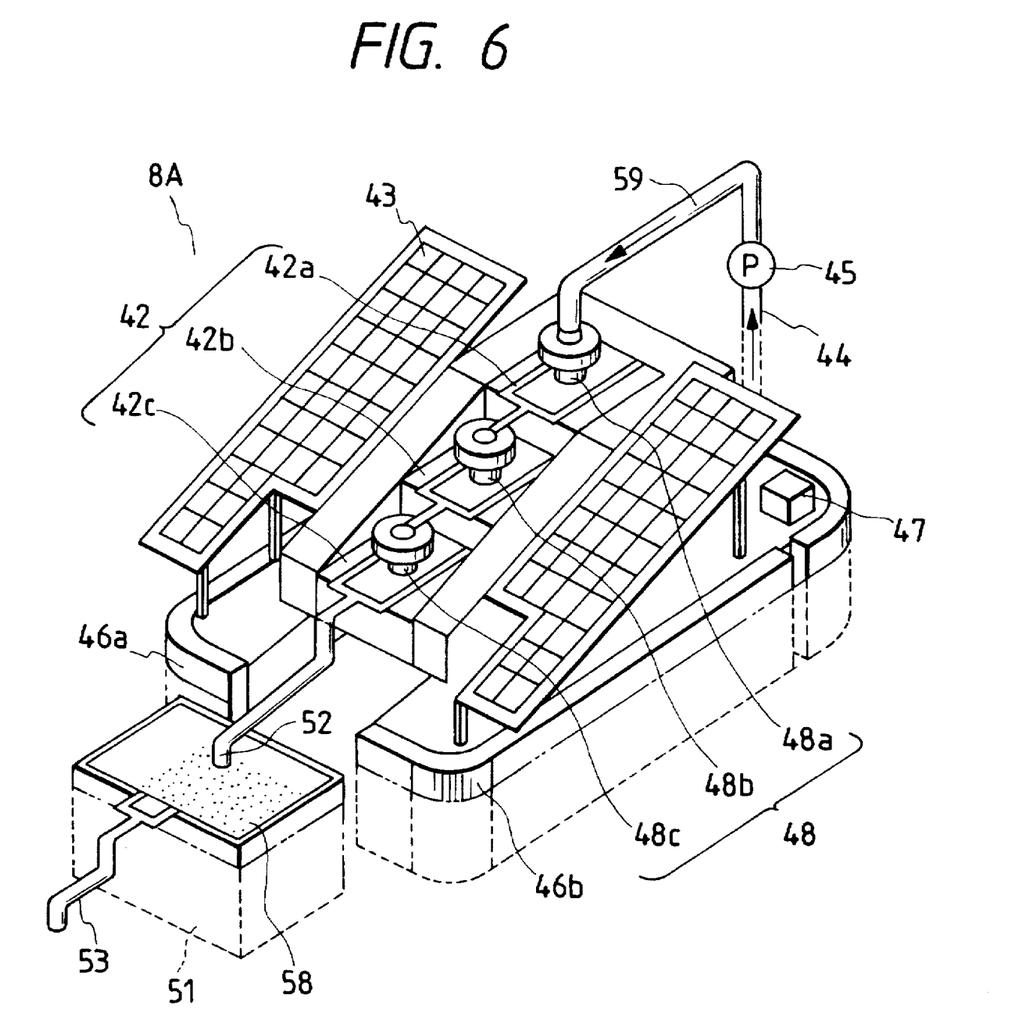
FIG. 6 is a perspective view of a fluidized bed purifier used for the purification system of this invention for lakes and marches.

FIG. 6 is a view of the fluid bed purifier used for a purification system of this invention for eutrophic lakes/marshes. FIG. 7 is a vertical cross section of the fluid bed purifier shown in FIG. 6.

The fluid bed purifier 8A, which is an example of the purifier 8, is installed on floating structures 46a and 46b formed in the shape of the letter H so that it can float in the water treating area 6 or at the opening 4a of the partition 4.

Although not illustrated, the floating structures 46a and 46b are anchored to the bottom of the lake. The fluid bed purifier 8A is mainly provided with a fluid bed filtration tank assembly 42 (including tanks 42a, 42b, and 42c) filled with filter media 49. Water is pumped, through a respective penstock 48 (48a, 48b, and 48c) in each tank to two or more pipes 56 (56a, 56b, and 56c) branched at the end of the penstock by water head difference. Thus, water flowing out of the pipes 56 in each tank flows into the filter media 49 (49a, 49b, and 49c) forming a filter bed, which separates and removes pollutants, in the respective tank, and then flows toward the top of the tank, as shown by the arrow in FIG. 7, and into the penstock of the next tank. The water is finally discharged from the discharge pipe 52 into a setting tank 51 as treated water.

Figure 7:
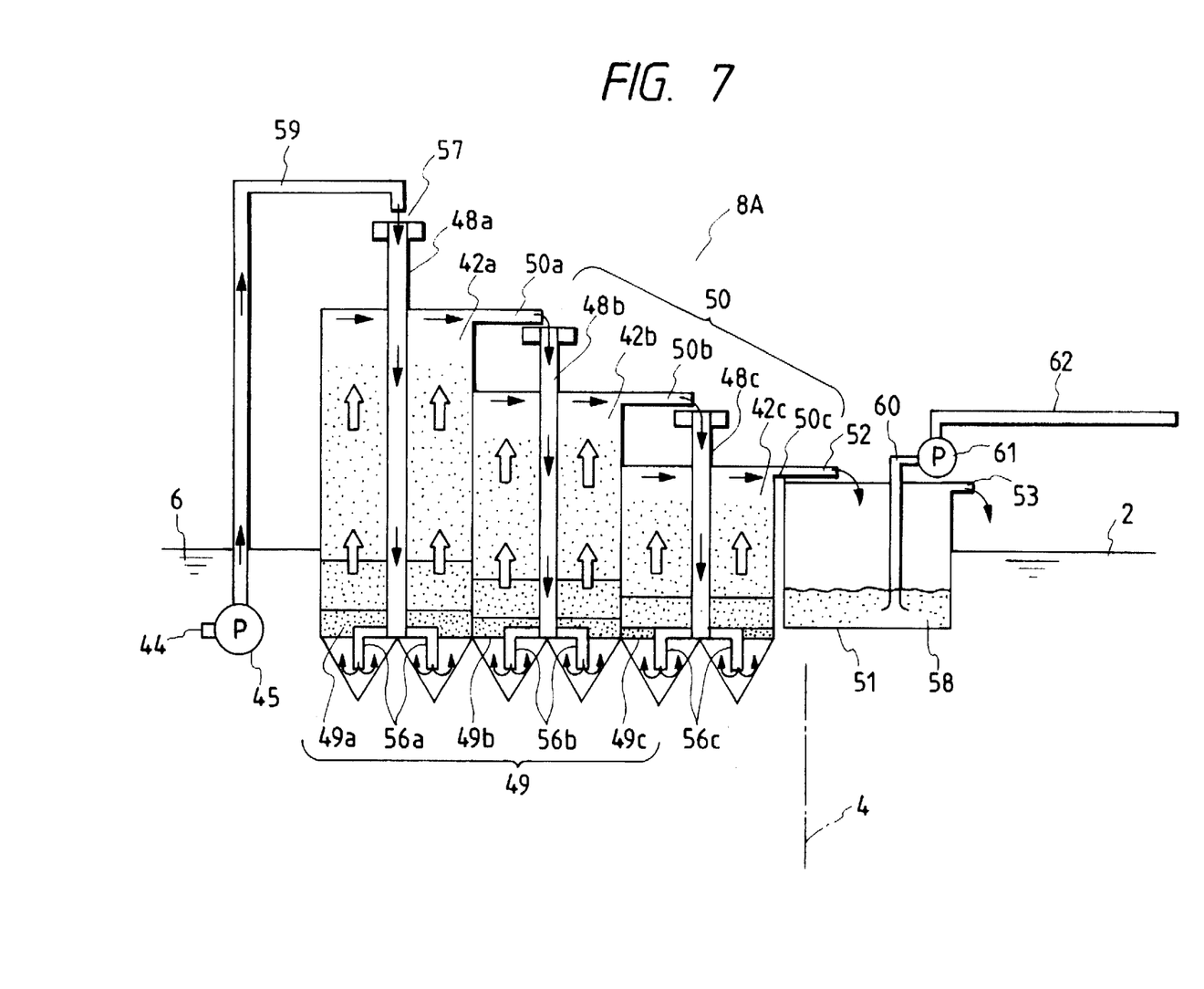
FIG. 7 is a vertical cross-sectional view of the fluidized bed purifier shown in FIG. 6.

In FIG. 7, it is seen that two or more filtration tanks are provided to extend the actual length of the filtration tank assembly 42 in a case where the water treating area 6 is shallow. The above filter media (49a, 49b, and 49c) may be, for example, ore and plastic filter media such as zeolite, etc.

Furthermore, the fluid bed purifier 8A is provided with the settling tank 51 to settle and remove floating matter contained in the treated water received from the discharge pipe 52. The water, after the flowing matter has settled and been removed in the settling tank 51, is discharged from the discharge pipe 53 to the target lake/marsh 2.

Furthermore, the fluid bed purifier 8A is provided with a pipe 59 to take in water containing pollutants, such as eutrophic materials, existing in the river, from the intake pipe 44 and to supply the water up to the upper end of the water-conveyance pipe 48a using a submersible pump 45.

The fluid bed purifier 8A is also provided with a power unit to supply power to the submersible pump 45, etc., and a controller 47 to control the submersible pump 45, etc. The power unit comprises a solar power generation panel 43 and a battery to store power generated by the solar power generation panel 43.

Further details of the fluid bed filtration tanks installed in two or more levels will be described with reference to FIG. 7.

As shown in FIG. 7 in more detail, the fluid bed filtration tanks 42a, 42b, and 42c are connected serially. For example, they are arranged at three different levels. The fluid bed filtration tanks 42a, 42b, and 42c are arranged side by side between the floating structures 46a and 46b so that their lower portions may be submerged respectively in the installation area. The water level in each of those filtration tanks is higher than that of the water treating area and the top of the first filtration tank 42a is higher than the top of the second tank 42b, and the top of the second filtration tank 42b is higher than the top of the third tank 42c.

Thus, water 57 pumped up by the submersible pump 45 is supplied through a water-conveyance pipe 48a to the bottom of the filter bed of the first filtration tank 42a, then is fed through the first filtration tank 42a to the second filtration tank 42b, and finally to the third filtration tank 42c sequentially, according to the water head difference determined by the difference of level among those filtration tanks 42a, 42b, and 42c.

The water 57 pumped up by the submersible pump 45 into the first filtration tank 42a goes down through the penstock 48a and then is discharged into the lower portion of the filtration tank 42a from the two or more pipes 56a branched at the lower end of the penstock 48a. Then, the water flows through the filter media 49a in the filtration tank 42a, forming a filter bed where it is purified while it contacts and passes through filter media 49a. After this, the water rises gradually, as shown by the arrow in FIG. 7, according to the difference of the water head from the penstock 48a and is supplied to the inlet (upper end) of the penstock 48b of the filtration tank 42b through the drain pipe 50a formed in the upper portion of the first filtration tank 42a.

The supplied water goes down through the penstock 48b in the filtration tank 42b and is discharged into the lower portion of the second filtration tank 42b from the two or more pipes 56b branched at the lower end of the penstock 48b. Then, the water flows through filter media 49b in the filtration tank 42b, forming a filter bed where it is purified while it contacts and passes through the filter media 49b and rises gradually, as shown by the arrow in FIG. 7, according to the difference of the water head from the penstock 48b. Then, the water is supplied to the inlet (upper end) of the penstock 48c of the filtration tank 42c through the drain pipe 50b formed in the upper portion of the first filtration tank 42b.

The supplied water goes down through the penstock 48c in the filtration tank 42c and is discharged into the lower portion of the third filtration tank 42c from the two or more pipes 56c branched at the lower end of the penstock 48c. Then, the water flows through the filter media 49c in the filtration tank 42c, forming a filter bed where it is purified while it contacts and passes through the filter media 49c and rises gradually, as shown by the arrow in FIG. 7, according to the difference of the water head from the penstock 48c. The water is then discharged into the settling tank 51 through the drain pipe 50c formed in the upper portion of the third filtration tank 42c, that is, the discharge pipe 52. The water is then reserved in the settling tank 51 so that floating matter in the water may settle and be removed. The purified water is discharged into the target lake/marsh 2 outside the above water treating area from the discharge pipe 53.

The filter media 49 supplied in the filtration tank 42 comprises, for example, ore such as zeolite, etc. and plastic filter media, so that pollutants, such as eutrophic materials, etc. stick on them, and when they grow up to a certain size, they are removed from filter media 49. The pollutants removed from the filter media are then discharged together with the water from the discharge pipe 52 and separated from the water in the settling tank 51, where they settle to the bottom of the tank 51 as sediment 58. Thus, pollutants such as eutrophic materials, etc. that stick on the filter media 49 and are separated from the water, never flow into the lake/marsh 2 either inside or outside the water treating area.

The sediment 58 in the settling tank 51 can be removed periodically and carried by boat onto land. Furthermore, if an engine is mounted on each of the floating structures 46a and 46b on which the above purifier 8A is installed, so that they can run by themselves, the sediment 58 can be carried to the bank 3 without using any boat. The sediment 58 accumulated at the bottom of the settling tank 51 can also be sucked out by a pressure pump 61 through a pipe 60 and transferred to land under pressure through a pipe 62.

In FIG. 7, filtration tanks 42a, 42b, and 42c are arranged serially at three different levels. This is to reduce the submersible pump head and save energy by lowering the filtration tank as much as possible while a certain length of the filtration tank assembly 42 is secured. Furthermore, the fluid bed filtration tanks may also be arranged just in one level or two or more levels (two levels or over four levels). And, they are not necessarily expected to be arranged serially. Instead of the above fluid bed purifier, an algae remover will also do.

The polluted water treating capacity of the above purification system is almost equal to the amount of the target river water flowing into the target lake/marsh at the river mouth if the partitioning means is formed in an area which extends from the river mouth by a distance of about 8 to 12 times the width of the river mouth where the flow rate becomes about ½ of that at the river mouth. For example, the capacity should be at a value enabling polluted water of 6000 to 20000 m³ to be treated per day.

According to the above embodiment, the water quality in the target water area, such as a lake, marsh, dammed lake, harbor, etc. can be improved by lowering the concentration of eutrophic materials, such as nitrogen, phosphorus, etc. contained in the target river water.

Furthermore, in a closed water area, such as a lake, marsh, dammed lake, harbor, etc. into which many rivers flow, the water quality can be improved effectively by purifying the water of those rivers in accordance with the amount of eutrophic materials contained in the individual rivers or the amount of the total flow of the individual rivers.

According to the above embodiment, no space is needed for installing equipment, such as water tanks, purifiers, etc. on land if a purifier is floated or fixed around a water area formed by enclosing and partitioning at least part of the river mouth in a closed water area, such as a lake, marsh, dammed lake, harbor, etc. in the direction of depth.

Furthermore, the above embodiment that uses fluid bed filtration tanks for the purifier can separate and remove pollutants, such as eutrophic materials, effectively and accordingly, it can lower the concentration of dissolved eutrophic, as well as floating matter, to improve the water quality in the target closed water area, such as a lake/marsh.

Furthermore, the above embodiment that uses fluid bed filtration tanks for the purifier and produces a water flow according to the difference of the water head can separate and remove pollutants, such as eutrophic materials, effectively using a small capacity power source for driving the intake pump.

As described above in detail, this invention can solve the problem of eutrophication caused by pollutants in each of various types of closed water area, such as a lake/marsh, etc. to obtain a good quality water source and provide a purifying method and equipment for restoring lakes and marshes to allow people to commune with the water in these closed water areas.

This invention can also provide a method and equipment for assuring effective purification of lakes and marshes by improving the water quality in a closed water area having a large amount of reserved water.

Furthermore, this invention can also provide a purification system that can purify lakes and marshes by separating pollutants, such as eutrophic materials and algae, from the water effectively by using the above devices, which are very simple in structure.

What is claimed is:

1. A method of purifying water in a lake/marsh into which a river flows, comprising the steps of:
    positioning a partition member around a substantial portion of the mouth of the river while leaving an opening for release of water, with the partition member extending from substantially the water surface to substantially the bottom of the river mouth to form a water treating area;
    taking in water from said water treating area to separate and remove pollutants from the water; and
    discharging treated water from which pollutants are separated and removed, to a portion of the lake/marsh outside said water treating area.

2. A method of purifying water in a lake/marsh into which a river flows, comprising the steps of:
    positioning a partition member around a substantial portion of an area of the lake/marsh around the mouth of the river while leaving an opening for release of water, with the partition member extending from substantially the water surface to substantially the bottom of the area, to form a water treating area;
    taking in water from said water treating area to separate and remove pollutants from the water; and
    discharging treated water, from which pollutants are separated and removed, to a portion of the lake/marsh outside said water treating water area.

3. A purification system for lakes and marshes into which a river flows, comprising:
    partitioning means for positioning around a substantial portion of the mouth of the river and extending from substantially the water surface to substantially the bottom of the river mouth, while leaving an opening for release of water, to form (forming) a water treating area; and
    purifying means for taking in water from the water treating area to separate and remove pollutants from the water, and for discharging treated water into the lake/marsh outside the water treating area.

4. A purification system for lakes and marshes as defined in claim 3, wherein said purifying means is provided in the water treating area.

5. A purification system for lakes and marshes as defined in claim 3, wherein said purifying means is provided on land near the mouth of the river.

6. A purification system for lakes and marshes as defined in claim 3, wherein said partitioning means comprises a plurality of partitioning members, each of which carries a weight thereunder, members for connecting said partitioning members to form a partitioning structure extending in the direction of water depth, and floating members holding said partitioning structure in the water.

7. A purification system for lakes and marshes as defined in claim 6, wherein said partitioning structure is provided with a plurality of openings.

8. A purification system for lakes and marshes as defined in claim 6, further comprising a metallic net member for protecting the outer periphery of said floating members.

9. A purification system for lakes and marshes, as defined in claim 3, wherein said purifying means comprises a pump for taking in water from the water treating area, a filtration tank assembly for purifying the water by contacting the water with a filter medium and for discharging treated water, and a settling tank for permitting settling of floating matter included in the water discharged from said filtration tank assembly.

10. A purification system for lakes and marshes as defined in claim 9, wherein said purifying means further comprises a floating structure for supporting said purification system so that said purification system can float in the water treating area in the lake/marsh.

11. A purification system for lakes and marshes as defined in claim 10, wherein said floating structure includes an engine for moving said purification system in the water.

12. A purification system for lakes and marshes as defined in claim 9, wherein said filtration tank assembly comprises fluid bed filtration tanks arranged at two or more different levels.

13. A purification system for lakes and marshes as defined in claim 3, wherein said purifying means comprises a pump for taking in water from the water treating area, a filtration tank assembly for purifying the water by allowing floating matter to settle in the water and by contacting the water with a filter medium, and for discharging treated water, and a settling tank for allowing settling of floating matter included in the water discharged from said filtration tank assembly.

14. A purification system for lakes and marshes as defined in claim 3, wherein said purifying means includes a solar power generation panel, and a battery for storing power generated by said solar power generation panel.

15. A purification system for purifying the water of a lake/marsh into which a river flows, comprising:

partitioning means for positioning in a lake/marsh around the mouth of the river but at a distance from the mouth of the river and extending from substantially the water surface to substantially the bottom of the area, while leaving an opening for release of water, to form a water treating area in the lake/marsh; and purifying means for taking in water from the water treating area to separate and remove pollutants from the water, and then for discharging treated water into the lake/marsh outside the water treating area.

16. A purification system comprising:

partitioning means for positioning in a lake/marsh around the mouth of a river flowing into the lake/marsh but at a distance from the mouth of the river of substantially ten times the width of the mouth of the river and to extend from substantially the water surface to substantially the bottom of the lake/marsh, while leaving an opening for release of water, to form a water treating area; and purifying means for taking in water from the water treating area to separate and remove pollutants from the water, and for discharging treated water into the lake/marsh outside the water treating area.

17. A purification system as claimed in claim 16, wherein the purifying means is capable of treating water in substantially the same amount as the amount of water flowing into the lake/marsh from the mouth of the river.

18. A purification system comprising:

partitioning means for positioning in a lake/marsh around the mouth of a river flowing into the lake/marsh but at a distance from the mouth of the river at which the water flow rate becomes about one half of the water flow rate in the mouth of the river and to extend from substantially the water surface to substantially the bottom of the lake/marsh, while leaving an opening for escape of water, to form a water treating area; and purifying means for taking in water from the water treating area to separate and remove pollutants from the water and for discharging treated water into the lake/marsh outside the water treating area.

19. A purification system as claimed in claim 18, wherein the purifying means is capable of treating water in substantially the same amount as the amount of water flowing into the lake/marsh from the mouth of the river.

20. A purification system for purifying lakes and marshes into which a river flows, said purification system comprising:

partitioning means for positioning in the lake/marsh around the mouth of the river but at a distance from the mouth of the river of about eight to twelve times the width of the mouth of the river, where the flow rate of the water becomes about one-half of the flow rate in the mouth of the river, and to extend from substantially the water surface to substantially the bottom of the lake/marsh, while leaving an opening for escape of water, to form a water treating area; and purifying means for taking in water from the water treating area to separate and remove pollutants from the water and for discharging treated water into the lake/marsh outside the water treating area.

21. A purification system as claimed in claim 20, wherein said purifying means comprises a purifier having fluid bed filtration tanks for installation in the water treating area at a plurality of different levels and able to treat polluted water at a rate of 6,000 to 20,000 $m^3$ per day.

* * * * *